Figure 1:
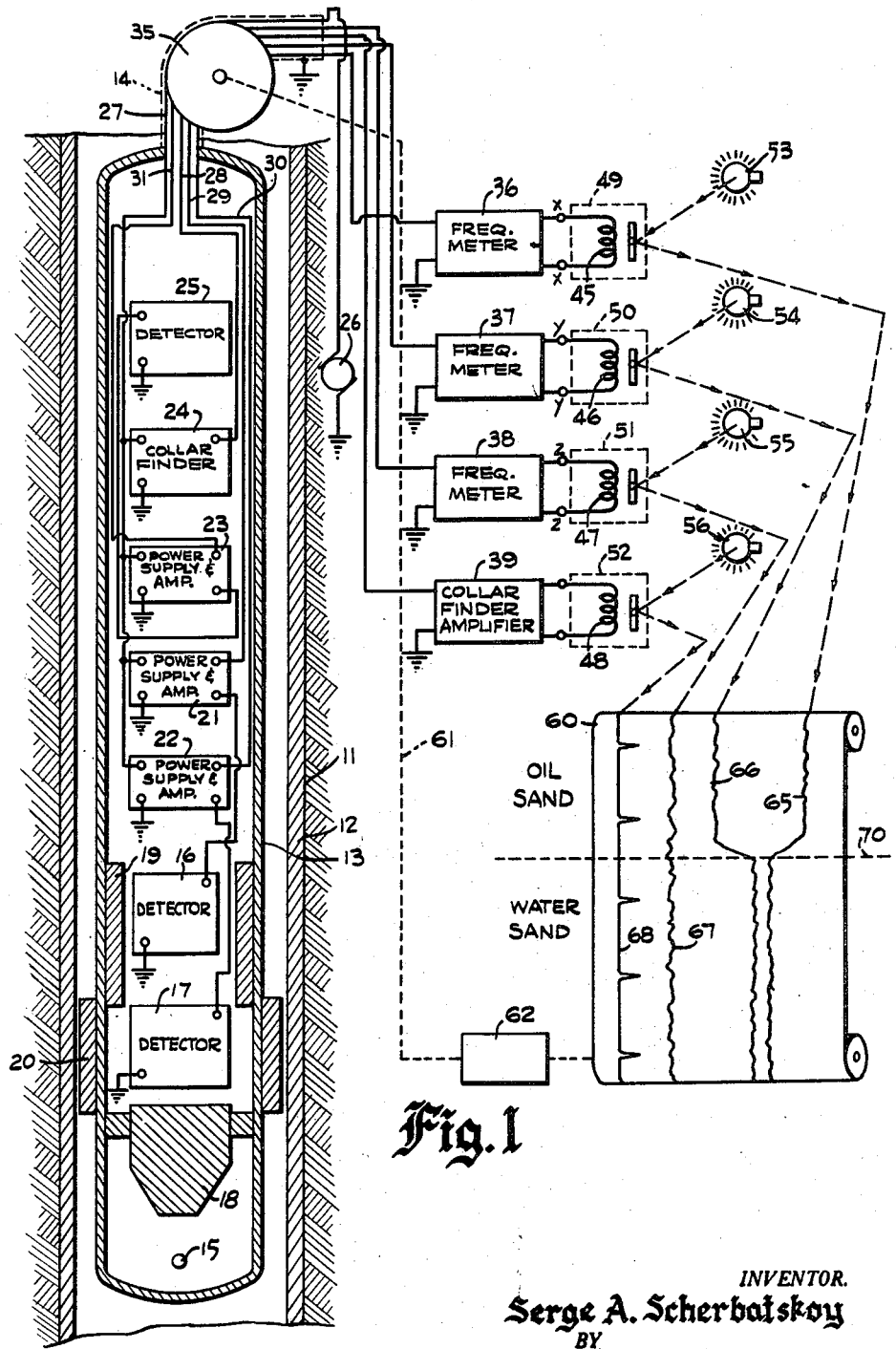

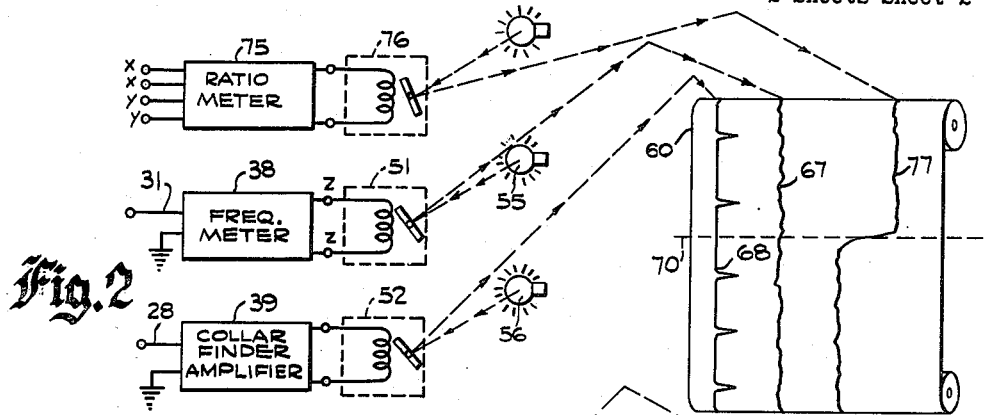
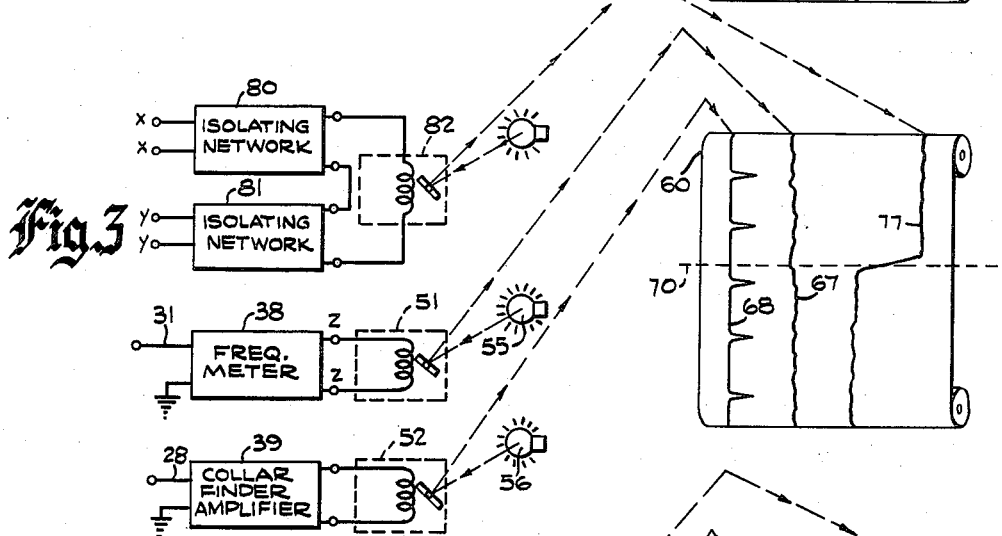
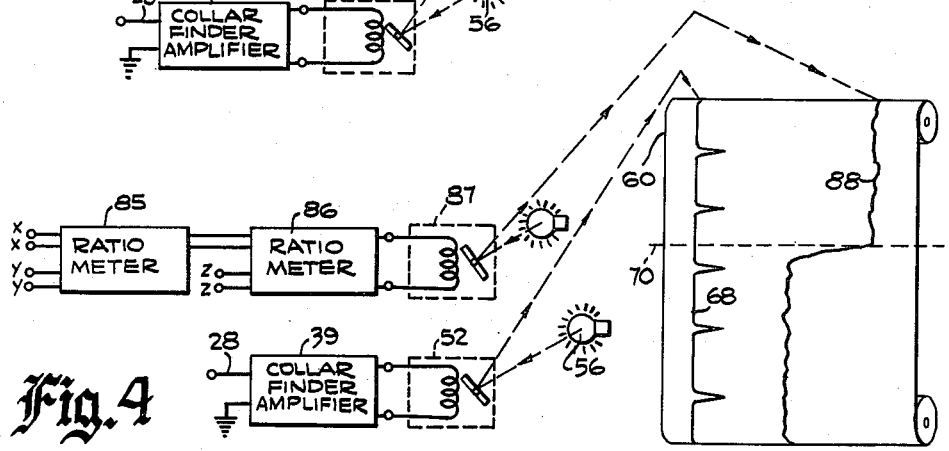

2,949,535

NUCLEAR WELL LOGGING METHOD AND APPARATUS

Serge A. Scherbatskoy, Littleton, Colo., assignor, by mesne assignments, to PGAC Development Company, Houston, Tex., a corporation of Texas Filed Feb. 9, 1955, Ser. No. 487,141

2 Claims. (Cl. 250—83.3)

This invention relates to a method of and apparatus for determining the nature of the strata penetrated by a bore hole; in particular, it is addressed to a novel method of and apparatus for logging the characteristics of such strata by analyzing the response of the formations penetrated by the bore hole to bombardment by nuclear particles.

In the prior art, arrangements have been known in which nuclear rays have been used to determine the characteristics of rocks traversed by bore holes, two of the most widely known of such arrangements being the "neutron-gamma ray" log and the "neutron-neutron" log. Experience has shown that both those systems provide a sensitive indication of the presence of hydrogen in the formations being studied, a well log produced by either of these arrangements being primarily a "hydrogen log." It has also been known to conduct a "natural gamma ray log" simultaneously with either one of the "hydrogen logs" described above in order to distinguish between radioactive shale layers containing hydrogen and oil and water formations which are not radioactive.

Neither the "neutron-gamma ray" nor the "neutron-neutron" system of well logging has been able, however, to differentiate successfully between oil and water, because both substances contain hydrogen in substantially equal proportions. Carbon and oxygen, the other major components of oil and water respectively, are widely found in the rocks themselves, so that attempts to differentiate between oil and water on the basis of detecting the presence of those elements have not succeeded. Such attempts have been further hampered by the fact that carbon is not nuclearly very active.

The major object of the present invention is to provide a method of and apparatus for nuclear well logging which is far more effective than any prior art arrangement for detecting oil and water and distinguishing between them.

The underlying principle of the present invention consists in making use of the known fact that both oil and connate water contain as impurities numerous "trace elements," usually in the form of salts, in addition to the basic elements oxygen, hydrogen, and carbon. It should be observed that while the above-described impurities have been referred to as "trace elements" these impurities may actually be present in substantial quantities and, accordingly, the term "trace" is not intended to carry any connation as to the particular amount present. The particular trace elements present in greatest proportion in water are different from those most prominently present in oil. It has been found possible by the method herein described to distinguish between oil and connate water by taking advantage of that fact. Thus, another object of the present invention is to provide a method of deep well logging in which indications of oil are distinguished from those of water by the different response of nuclear rays to the trace elements respectively present in subterranean oil and connate water.

Specifically, it has been found that it is possible to distinguish between oil and water in subsurface formations by noting the difference in gamma-ray response and in slow-neutron response of such formations when bombarded by fast neutrons. Hence, a specific object of the present invention is to provide a well logging method wherein neutron-gamma ray and neutron-neutron logs are simultaneously made and compared, so as to derive a resultant function which represents the difference or ratio of readings of the two logs at each well depth.

It is another object of the present invention to provide a new and improved method of and apparatus for simultaneously making a natural gamma ray log, a neutron-gamma ray log and a neutron-neutron log in correlation with depth and during one pass through the bore hole so that fluid bearing formations may be detected and the type of fluid, i.e., oil or water, identified.

Other objects and advantages of the present invention will become apparent from the detailed description thereof which follows.

The trace-element sodium is much more commonly found in connate water than in oil, the sodium-hydrogen ratio for oil being much lower than the corresponding ratio for connate water. Most of the sodium present exists in the form of the salt sodium chloride, and hence chlorine is another trace element which is much more common in connate water than in oil.

It has been discovered that, for a given type of rock, characterized by a given degree of porosity and fluid content, the presence of sodium chloride in the fluid tends to decrease the reading of a neutron-neutron log and to increase the reading of a neutron-gamma ray log. It is believed that this phenomenon is due to the fact that some of the trace elements found in salt form, such as sodium and chlorine, possess neutron-capture cross sections greater than those characteristic of carbon and oxygen. Hence, when salts are present in substantial proportion in a given formation, the slow neutrons returned to the detector as a result of neutron bombardment are substantially fewer than when no appreciable quantity of salt is present. The term slow neutrons as used herein refers to neutrons having energies usually less than approximately 10 E.V.

Interestingly, it has also been found that the presence of salt in a formation has the opposite effect on a neutron-gamma ray log—that is, the presence of salt increases the reading of the neutron-gamma ray log. This effect, it is believed, is due to the fact that, when the elements in the salts, such as sodium and chlorine, absorb neutrons, they achieve energy stability by emitting strong, high-energy gamma rays.

Thus, the ratio of the reading of a neutron-neutron logging instrument to the reading of a neutron-gamma ray logging instrument, at a given depth, other factors being equal, is an indication of the salt content of the fluid in the formation, the ratio being maximum when the fluid is oil.

Since it is important that the ratio or difference readings indicating the character of the fluid in the rocks be substantially unaffected by variables other than depth, it is desirable that the neutron-neutron and neutron-gamma ray logs be made simultaneously and preferably with instruments which are very close together.

In some instances, however, it has been desirable, in order to assist in determining the presence of trace elements and in differentiating between oil and water, to employ more than one neutron-neutron measurement or more than one neutron-gamma ray measurement. For such cases, it is desirable to use two more widely spaced detectors of like radiation and to record the ratio of their outputs as a function of depth. By recording the ratio of the detector outputs instead of the intensities themselves, the various interfering effects such as variations in the source, well bore diameter variations and changes in the properties of the fluid within the casing are eliminated because these factors have the same effect on both detectors and, accordingly, are minimized when the ratio is taken.

In the accompanying drawing, apparatus suitable for the practice of the method of the present invention has been illustrated. In the drawing, Fig. 1 is a diagrammatic and sectional representation of equipment suitable for logging a well in accordance with the method of the present invention. Fig. 2 is a fragmentary diagrammatic view showing the use of a ratio meter in an alternative arrangement for producing indications in the practice of the method of the present invention, Fig. 3 is a similar fragmentary view showing the use of a difference circuit in still another alternative arrangement for producing indications, and Fig. 4 is a fragmentary diagrammatic view of a still different circuit arrangement according to the present invention.

In Fig. 1 a bore hole has been diagrammatically illustrated and indicated by the reference numeral 11, said bore hole preferably being provided with a conventional metal casing 12. A logging instrument provided with a suitable pressure-resisting housing 13 is arranged to be lowered and raised within the well on an armored cable 14, preferably comprising a conducting outer armor or sheath and five inner conductors.

Mounted within the casing 13 at a point preferably near one end thereof there is provided a neutron source 15, which may consist of a capsule or ampule containing a mixture of radium and beryllium. Also arranged within the casing 13 and spaced axially away from the neutron source 15 are a neutron detector 17 and a gamma-ray detector 16. A shield 18, made of tungsten, lead, or other suitable material, is disposed within the casing 13 between the neutron source 15 and the detectors 16 and 17, to prevent the direct rays from the neutron source 15 from affecting these detectors. In addition, the gamma-ray detector 16 is provided with a cylindrical shield 19 to prevent its being affected by scattered gamma rays emanating from the radiation source 15 and returning to the logging instrument via the surrounding formations. Such scattered gamma rays all have energies substantially less than 2 mev. and in general have energies of only a few hundred kev. Gamma rays produced as a result of neutron captures, however, all have energies of approximately 2.2 mev. or above, and it is gamma rays of that class which are of interest in the practice of the present invention. In fact, the gamma rays which are of particular interest—those resulting from capture of neutrons by the atoms found in metallic salts—usually have energies in the neighborhood of 7 mev. Hence the shield 19 should be designed to attenuate sharply all gamma rays of energies less than 2 mev. and to favor the passage of gamma rays of energies in the neighborhood of 7 mev. and above. The term "in the neighborhood of 7 mev." as used in the specification and claims, refers to energies above about 3 mev. and below about 10 mev. It has been found that shield 19, if made of lead, should have a thickness of the order of ¼ to ¾ inch to provide the desired energy attenuation. If made of tungsten, of course, the shield 19 may be thinner.

Neutron counter 17 usually operates more satisfactorily when shielded by shield 20 which is preferably placed outside the housing 13. In order to accentuate the slow neutrons having energies below 10 E.V. the shield 20 is designed to have preferential transmission for slow neutrons and attenuation for fast neutrons. To this end, the shield 20 may, for example, be made of nickel or magnesium which materials exhibit the desired properties. Shield 20, furthermore, displaces some of the well fluid which usually is hydrogenous and has high neutron attenuation.

In order to measure gamma rays naturally emanating from the formations a natural gamma ray detector 25 is positioned within the casing 13 at the top end thereof and spaced a sufficient distance from the neutron source 15 that gamma rays emitted by the source 15 and gamma rays of capture arising in the formations due to neutron bombardment thereof are substantially completely attenuated before reaching the detector 25 and hence cause no response in this detector. As a result, the detector 25 responds only to gamma rays naturally emitted by the rocks and provides, in conjunction with the detectors 16 and 17, an arrangement for distinguishing between radio-active shales and sandstones and limestones which may be oil bearing.

Each of the detectors 16, 17 and 25 is provided with a suitable power supply and amplifier which is energized from the alternating current source 26 over the conductor 27 of the cable 14. Thus, the detector 16 is connected to the power supply and amplifier unit 21 so that the detector 16 receives a unidirectional operating potential from the unit 21 and supplies a detector signal to the amplifier portion of the unit 21. In a similar manner, the detector 17 is connected to the power supply and amplifier unit 22 and the detector 25 is connected to the power supply and amplifier unit 23. Also arranged within the casing 13 is a collar finder unit 24 which is energized from the alternating current power conductor 27 and supplies a collar finder signal over the conductor 28 of the cable 14 to the surface equipment to be described in more detail hereinafter.

Detectors 16 and 25 may be any conventional gamma-ray detectors such as a Geiger counter or a scintillation counter. When properly provided with D.C. biasing voltage from the supply 21 the detector 16 will produce electrical pulses, the frequency of which provides an indication of the intensity of the gamma rays impinging thereon. These pulses are amplified in the amplifier portion of the unit 21 and are then transmitted over the conductor 29 of the cable 14 to the surface. Also, when the detector 25 is suitably energized from the unit 23 it produces pulses the frequency of which provides an indication of the intensity of naturally emitted gamma rays impinging thereon. The pulses from the detector 25 are amplified in the unit 23 and are transmitted over the conductor 31 of the cable 14 to the earth's surface.

Neutron detector 17 may be conventional in character and should preferably be filled with boron trifluoride to make it sensitive to slow neutrons. When detector 17 is provided with suitable D.C. biasing voltage from the supply 22 it produces electrical pulses the frequency of which provide a measure of the intensity of the slow neutrons traversing the instrument. These electrical pulses are amplified in the unit 22 and are then transmitted over the conductor 30 of the cable 14 to the surface. It will be understood that the cable 14 may be up to several thousand feet in length, and will be payed out or taken in by means of a conventional reel or pulley arrangement which includes measuring wheel 35. Since such a cable is conventional in all deep well logging arrangements, it will not be described in detail in this specification.

At the earth's surface the amplified pulses originating in the detector 17 are supplied over the conductor 30 to a conventional frequency meter 36 which is arranged to develop a unidirectional output voltage or current the magnitude of which at any instant is proportional to the frequency of the pulses applied thereto. The amplified pulses originating in the detector 16 are supplied over the conductor 29 to a frequency meter 37, and the amplified pulses originating in the detector 25 are supplied over the conductor 31 to a frequency meter 38. The collar finder signal developed by the unit 24 is supplied over the conductor 28 to a collar finder amplifier 39. The collar finder portion of the apparatus may comprise any suitable arrangement for producing a voltage fluctuation or kick each time the unit 13 traverses a casing collar. For example, a collar finder arrangement such as described in my copending application Serial No. 205,616, which was filed on January 12, 1951, now U.S. Patent No. 2,740,053, may be employed to develop unidirectional voltage fluctuations which are amplified in the amplifier 39.

In the arrangement illustrated in Fig. 1, the varying D.C. output currents of the frequency meters 36, 37 and 38 are respectively applied to the coils 45, 46 and 47 of mirror-galvanometers 49, 50 and 51. The mirrors in the galvanometers 49, 50 and 51 reflect light from the light sources 53, 54 and 55, respectively, onto the sensitized film surface of a conventional recorder 60, the film of which is advanced in step with the rotation of measuring wheel 35 by means of a suitable mechanical linkage 61 and a speed-reduction gear box 62. The fluctuating D.C. output current of the collar finder amplifier 39 is supplied to the coil 48 of a mirror-galvanometer 52 so that light from the source 56 is reflected onto the film surface of the recorder 60.

The effect of the arrangement illustrated in Fig. 1 and just described is to provide on the film of recorder 60 a first trace or log 65 which is proportional to the intensity of the neutron rays returned to the logging instrument 13 from the surrounding formations, a second log 66 which is proportional to the intensity of the gamma rays of capture returned to the logging instrument from the surrounding formations, a third log 61 of the intensity of gamma rays naturally emanating from the surrounding formations and interrupted by the detector 25, and a fourth log 68 which indicates the position of casing collars traversed by the logging instrument.

The series of nuclear reactions which produces the logs 65 and 66 is substantially as follows: Fast neutrons having about 5 mev. energy are projected into the surrounding formations from the radiation source 15. Those fast neutrons are slowed down and in large part are absorbed by hydrogen nuclei in the formations. Of the neutrons which are merely slowed down, some having energies below approximately 10 electron volts diffuse back to the logging instrument and are detected by the neutron detector 17. The neutrons that are captured or absorbed by the hydrogen nuclei in the formation result in the emanation of gamma rays having an energy of approximately 2.2 mev., some of which impinge upon the logging instrument and are detected by detector 16. Still other neutrons will be captured by elements other than hydrogen and will produce gamma rays of energies ranging between 5 and 10 mev. Since it is the gamma rays thus produced by elements other than hydrogen that are of particular interest in this invention, the shield 19 is designed to emphasize such high-energy gamma rays over the rays having energy levels in the neighborhood of 2 mev. and lower.

In the practical task of distinguishing oil from water in a deep well logging operation, we are particularly interested in the gamma rays of capture emanated from sodium and chlorine, both of which have strong components in the neighborhood of 7 mev.

Suppose now, for purposes of illustration, that the logging instrument is disposed at a depth at which it is surrounding by rock containing oil in its pore spaces. In that event, the response of both detectors 16 and 17 will be moderate.

If, on the other hand, the fluid in the rock pores is water, containing, as is characteristic, a considerable amount of sodium chloride or other metallic salt, the response of the neutron detector 17 will be decreased substantially, while the response of gamma-ray detector 16 will be increased. Thus, as shown generally in Fig. 1, if the instrument is disposed in an oil sand formation, i.e., above the dotted line 70, the logs 65 and 66 are of moderate amplitude. However, when a water sand formation is traversed, i.e., below the line 70, the log 65 moves to the left corresponding to a decrease in the response of the neutron detector 17 and the log 66 moves to the right corresponding to an increase in the response of the gamma ray detector 16.

The reason for the above described effect may be found in the fact that sodium, chlorine, and the other components of the common metal salts possess large capture cross sections for neutrons, and, after capturing neutrons, those elements regain energy stability by emitting high-energy gamma rays. As a result, when the logging instrument is receiving emanations from a formation containing metallic salts the neutron capture will be increased, resulting in a reduced number of returned neutrons striking detector 17. At the same time, the increased number of neutron captures by the metallic-salt elements will produce an increased number of high-energy gamma rays. The quantities of hydrogen contained in oil and pure water are about the same, with the result that the two fluids will provide about the same neutron absorption, save for the effect of the dissolved salts, which in the present invention is used as a means of distinguishing oil from water. The natural gamma ray log 67 may be employed in correlation with either the neutron-neutron log 65, or the neutron-gamma ray log 66, or both, to distinguish between radio-active shales, and the like, and sandstones and limestones which may be oil producing. Thus, the log 67 has a relatively low value in both the oil sand and water sand formations illustrated in Fig. 1.

In the system of Fig. 1, the gamma ray detector 16 has been illustrated as shielded by the shield 19, so as to respond preferentially to gamma rays in the neighborhood of 7 mev., and the neutron detector 17 has been illustrated as shielded by the shield 20, so as to respond preferentially to slow neutrons having energies below 10 E.V. With this arrangement the neutron curve 65 decreases at the same time the gamma ray of capture curve 66 increases and an accurate determination of the presence of chlorine in the formations can be obtained by comparing the curves 65 and 66. However, it will be understood that other combinations of induced radiation logs can be employed wherein only one log varies in response to the presence of chlorine in the formations while the other log is substantially unaffected by chlorine. For example, the shield 20 surrounding the neutron detector 17 may be arranged to attenuate slow neutrons having energies below 10 E.V. so that the detector 17 responds preferentially to slow neutrons having energies about 10 E.V. With this arrangement the log 65 will not be appreciably affected by the presence of chlorine in the formations. However, the log 66 which responds to gamma rays of capture having energies in the neighborhood of 7 mev. will increase when chlorine is present in the formations so that by comparing the logs 65 and 66 oil sand can be distinguished from water sand. In the alternative, the shield 19 for the gamma ray detector 16 may be arranged to attenuate gamma rays of capture having energies above about 5 mev., so that the detector 16 responds only to gamma rays of capture having energies below about 5 mev., while the detector 17 responds to slow neutrons having energies below about 10 E.V. In this alternative arrangement the log 66 would not be influenced by the presence of chlorine but the log 65 would decrease in response to chlorine and by comparing the logs 65 and 66 the presence of chlorine can be detected.

The above described detection of the presence of chlorine in the formations, which permits water sand to be distinguished from oil sand, can also be performed by employing two induced radiation logs of the same type. Thus, a second gamma ray detector may be substituted for the neutron detector 17, this second gamma ray detector being shielded so as to respond only to gamma rays of capture having energies below about 5 mev. Since the detector 16 responds to gamma rays of capture having energies above about 5 mev., the log 66 will increase when chlorine is present in the formations whereas the log produced by the second gamma ray detector will not be influenced by chlorine so that the desired comparison can be made. In a similar manner the gamma ray detector 16 may be replaced by a second neutron detector suitably shielded so that it responds only to slow neutrons having energies above about 10 E.V. In this arrangement the neutron detector 17 would exhibit a decreasing response when chlorine is present in the formations whereas the second neutron detector response would be substantially unaffected thereby. In all of the above examples it will be understood that the natural gamma ray log 67 may be employed in the manner described above in correlation with the induced radiation logs. Also, each of the above examples involves the taking of a first induced radiation log which is responsive to hydrogen and a second induced radiation log which is responsive to hydrogen and chlorine, the presence of chlorine being determined by comparing these logs in sand formation regions.

If desired, the separate logs produced by detectors 16 and 17 may be combined into a single log by feeding the outputs of the frequency meters 36 and 37 into a conventional ratio meter 75, as shown in Fig. 2. The ratio meter 75 may be of the type disclosed in Patent No. 2,129,880 to Scherbatskoy et al. granted September 13, 1938. In such event, the output of meter 75, being a current proportional to the ratio of the respective responses of detectors 16 and 17, is fed into a single galvanometer 76, and a single trace 77 recorded on the moving film of the recorder 60. When such an arrangement is used, any substantial change in the ratio of the intensities of the radiations received by the two radiation detectors 16 and 17 will appear on the trace 77 in the manner indicated in Fig. 2.

While one particular method of comparison comprising the use of the ratio of radiation intensities from the detectors 16 and 17 has been described herein, it is contemplated as an alternative arrangement to measure the difference in the two intensities. Essentially the same information will be obtained by measuring the difference, as opposed to the ratio, although it may involve the necessity for greater care in interpretation of data, due to the fact that extraneous factors, such as change from one type of rock formation to another, will normally have a greater effect on the difference between the responses of the two detectors than on their ratio. A person experienced in deep well logging by means of nuclear rays, however, can, with care, readily distinguish such aberrations by analysis of the individual logs of either the returned neutrons or the gamma rays of capture, so that the "difference" log will provide a dependable means of distinguishing oil formations from water formations.

There is diagrammatically illustrated in Fig. 3 a simple means of recording a difference log which may be used alone or, if desired, in connection with simultaneously recorded logs derived from one or both of the individual counters 16 or 17. In accordance with this arrangement, the outputs of frequency meters 36 and 37 may be fed through suitable isolating networks 80 and 81, respectively, and then connected in series opposition to galvanometer 82, which will thereupon, as the logging instrument moves through the well, produce a log on the moving film of the recorder 60 reflecting for each depth the difference in ray intensity detected by the respective detectors 16 and 17. The isolating networks 80 and 81 may be any suitable conventional devices such as cathode followers. If no individual logs are being made of the radiation intensities detected by the detectors 16 and 17, the isolating networks 80 and 81 may be omitted.

In the event that a direct indication of the correlation of logs 65, 66 and 67 is desired, the arrangement of Fig. 4 may be employed wherein the variations of the natural gamma ray log 67 are taken into consideration. Referring to Fig. 4, the outputs of the frequency meters 36 and 37 are supplied to a first ratio meter 85, which is similar to the ratio meter 75 described in more detail above in connection with Fig. 2, and the output of the ratio meter 85 is supplied to a second ratio meter 86 to which is also supplied the output of the frequency meter 38. The output of the second ratio meter 86 is supplied to the coil of a mirror-galvanometer 87 so as to produce the composite trace or log 88 on the recording film of the recorder 60. Accordingly, the log 88 provides a direct indication of the ratio of the neutron-neutron and neutron-gamma ray response ratio to the natural gamma ray response of the detector 25.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. A well logging method for distinguishing the depth at which an hydrogenous earth formation traversed by a borehole contains a characteristic substance having a neutron capture cross section that is appreciably higher than the neutron capture cross section of hydrogen from those depths at which said formation does not contain said substance comprising the steps of, bombarding the formation with neutrons, measuring the intensity of the neutron rays of substantially thermal energy emanated from said formation responsively to such bombardment, simultaneously measuring the intensity of gamma rays of capture having energies in the neighborhood of 7 mev. emanated from said formation responsively to such bombardment, recording said intensities on a common record in correlation with depth, and comparing said intensities to locate regions wherein the presence of said substance causes an increase in the intensity of said gamma rays of capture relative to the intensity thereof if said substance is absent from the formation and also causes a decrease in the intensity of said measured neutrons relative to the intensity thereof if said substance is absent from the formation.

2. The method of claim 1 which includes the additional steps of simultaneously measuring the intensity of gamma rays naturally emanated from the formations and recording the measured intensity of said natural gamma rays on said common record.

References Cited in the file of this patent

UNITED STATES PATENTS

| | | |
|---|---|---|
| Re. 24,383 | McKay | Oct. 29, 1957 |
| 2,323,484 | Neufeld | July 6, 1943 |
| 2,463,733 | Albaugh | Mar. 8, 1949 |
| 2,469,463 | Russell | May 10, 1949 |
| 2,508,772 | Pontecorvo | May 23, 1950 |
| 2,712,081 | Fearon | June 28, 1955 |
| 2,721,944 | Ruble | Oct. 25, 1955 |
| 2,740,053 | Scherbatskoy | Mar. 27, 1956 |
| 2,752,504 | McKay | June 26, 1956 |
| 2,776,378 | Youmans | Jan. 1, 1957 |